(12) United States Patent
Paul

(10) Patent No.: US 6,886,053 B2
(45) Date of Patent: Apr. 26, 2005

(54) METHOD, SYSTEM, AND PROGRAM FOR MANAGING ACCESS TO A DEVICE

(75) Inventor: Stephen D. Paul, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 161 days.

(21) Appl. No.: 10/156,872

(22) Filed: May 28, 2002

(65) Prior Publication Data

US 2003/0225950 A1 Dec. 4, 2003

(51) Int. Cl.$^7$ ................................................ G06F 3/00
(52) U.S. Cl. ............................... 710/38; 710/8; 710/15
(58) Field of Search ............................... 710/36–38, 8, 710/15

(56) References Cited

U.S. PATENT DOCUMENTS

| | | | | |
|---|---|---|---|---|
| 6,167,459 A | * | 12/2000 | Beardsley et al. | 710/3 |
| 6,247,099 B1 | * | 6/2001 | Skazinski et al. | 711/141 |
| 6,457,098 B1 | * | 9/2002 | DeKoning et al. | 711/114 |
| 6,490,659 B1 | * | 12/2002 | McKean et al. | 711/141 |
| 6,631,484 B1 | * | 10/2003 | Born | 714/129 |
| 2003/0037071 A1 | * | 2/2003 | Harris et al. | 707/200 |

OTHER PUBLICATIONS

Introduction to SCSI Concepts, http://developer.apple.com/documentation/mac/Devices/Devies–120.html.*

U.S. Application entitled "Method, System, and Article of Manufacture for a Firmware Image", filed May 17, 2002, inventors Scott A. Thurston, et al.

U.S. Application entitled "Method, System, and Article of Manufacture for a Firmware Downloads", filed May 17, 2002, inventors Scott A. Thurston, et al.

IBM, "Commands Reference, vol. 2", [online], pp. 1–4. [Retrieved on May 1, 2002]. Retrieved from the Internet at URL: <http://publibn.boulder.ibm.com/doc_link/en_US/a_doc_lib/cmds/aixcmds2/diag.htm>.

IBM, "Commands Reference, vol. 3", [online], pp. 1–3. [Retrieved on May 1, 2002]. Retrieved from the Internet at URL: <http://publibn.boulder.ibm.com/doc_link/en_US/a_doc_lib/cmds/aixcmds3/lmscode.htm>.

IBM, "Understanding the Diagnostic Subsystem for AIX", [online], pp. 1–30, [Retrieved on May 1, 2002]. Retrieved from the Internet at URL: <http://publibn.boulder.ibm.com/doc_link/en_US/a_doc_lib/aixprggd/diagunsd/Service-Aids...>.

* cited by examiner

Primary Examiner—Fritz Fleming
Assistant Examiner—Alan Chen
(74) Attorney, Agent, or Firm—Finnegan, Henderson, Farabow, Garrett & Dunner, L.L.P.

(57) ABSTRACT

Provided are a method, system, and program for selecting a path to a device to use when sending data requests to the device. Data requests are submitted to the device on a first path. Device information is maintained indicating a position of a data transfer mechanism of the device that performs the submitted data request. A second path to the device is selected if the first path fails. Data requests are submitted to the indicated position.

32 Claims, 14 Drawing Sheets

METHOD, SYSTEM, AND PROGRAM FOR MANAGING ACCESS TO A DEVICE

BACKGROUND OF THE INVENTION

1. Field of the Invention

The present invention relates to a method, system and program for managing access to a device.

2. Description of the Related Art

In prior art multi-pathing systems, multiple paths may connect a host system to a device, such as a storage array, e.g., Redundant Array of Independent Disks (RAID) array, a Direct Access Storage Device (DASD), Just a Bunch of Disks (JBOD), etc. Both the host and the storage device would have multiple ports and/or network adaptors to provide multiple physical paths therebetween.

A host system includes a device driver program to manage Input/Output (I/O) flow to a storage device or any other type of device. If there are multiple paths connecting the host to the storage device, then either the device driver or host operating system would include logic to manage path selection and handle failover to select one available path if the currently used path fails. In prior art failover systems, a queue is provided to hold received I/O requests during the failover operation. When the failover operation completes with a new path configured for use, the host would then process the queued I/O requests that have been pending during the failover process.

There is a continued need in the art for improved techniques and program architectures for managing multiple paths to a device and handling failover operation.

SUMMARY OF THE PREFERRED EMBODIMENTS

Provided are a method, system, and program for handling Input/Output (I/O) requests to a target device. An I/O request is received that is directed toward the target device. A determination is made of a first device object associated with the target device and a determination is made from a second device object associated with the target device of whether the device is available. The first and second device objects provide information on the target device. A determination is made of a path to the target device and the I/O request is transmitted on the determined path to the target device if the device is determined to be available.

In further implementations, a first path object and second path object provide information on one path to the device. In such implementations, determining the path further comprises determining from the second device object associated with the target device one second path object and determining from the first path object information to transmit the I/O request to the target device using the path associated with the first and second path objects.

Still further, a plurality of first and second path objects may be associated with different paths to the device, and the second device object may indicate a plurality of second path objects providing information on the paths to the device.

In yet further implementations, a first program module performs the steps of receiving the I/O request and determining the first device object, and a second program module performs the steps of determining from the second device object whether the device is available and determining the path to the target device. In such implementations, the first program module transmits a device availability request to the second program module to determine whether the target device is available and the second program module returns indication of whether the target device is available.

Further provided are a method, system, and program for representing a plurality of paths to at least one device. Paths are detected to a device. For each detected path, a first path object and second path object providing information on the path are generated and for each detected device a first device object and second device object are generated. Indication is made in the second device object each path to the device.

In further implementations, indicating each path in the second device object comprises indicating an identifier of each second path object for each path to the device.

Yet further, identifiers for the first and second path objects and first and second device objects are generated. The identifiers for the first and second path objects for one path are included with each of the first and second path objects generated for the path and the identifiers for the first and second device objects for one device are included with each of the first and second device objects generated for the device.

Described implementations provide an object schema to manage multiple paths to one or more devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Using Device Driver Objects to Manage Access to Devices

Figure 1:
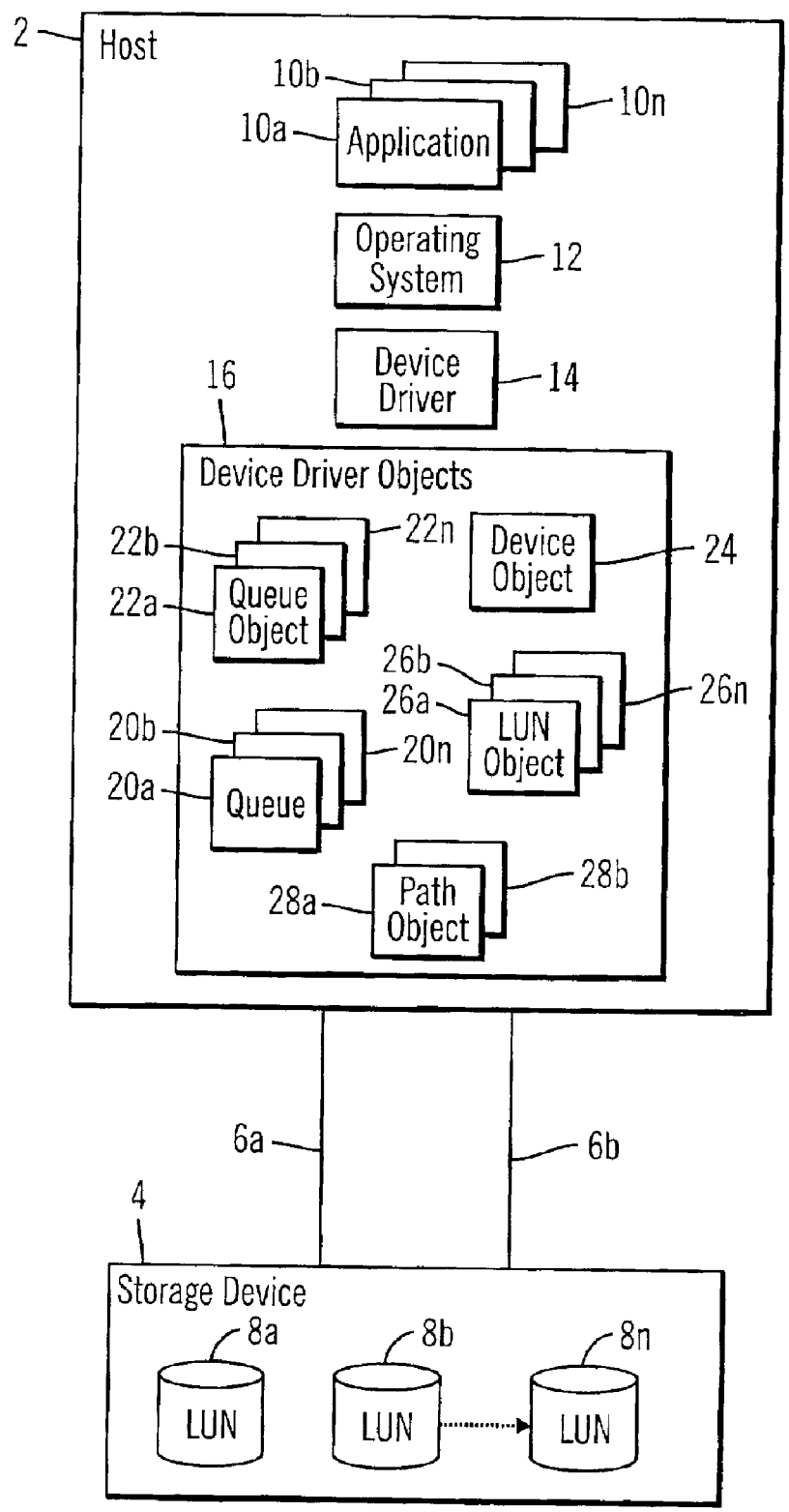
FIG. 1 is a block diagram illustrating a computing environment in which aspects of the invention are implemented.

FIG. 1 illustrates a computing environment in which aspects of the invention are implemented. A host system 2 communicates with a storage device 4 through multiple paths 6a, 6b. The paths 6a, 6b may comprise direct lines or utilize a hub, switch, fabric, etc. that utilize any communication interface technology known in the art, such as Fibre Channel, a parallel or serial connection, TCP/IP, Ethernet, etc. Although only one storage device 4 is shown, the host system 2 may connect via one or more paths to any number of storage devices or other Input/Output (I/O) devices using a same network or different networks. In certain implementations, the storage device 4 includes a plurality of logical devices, also known as logical unit numbers (LUNs) 8a, 8b . . . 8n.

The host 2 includes a plurality of application programs 10a, 10b . . . 10n, which may comprise any application program known in the art, an operating system 12, and a device driver 14. The application programs 10a, 10b . . . 10n would communicate I/O requests to the operating system 12, which in turn would call the device driver 14 to handle communication with the device 4. If the host 2 is connected to different types of devices, then the host may include a separate device driver for each such different device type. In certain implementations, one device driver 14 may handle the connection to multiple instances of a same type of device, where a type of device comprises a particular device from a particular manufacture, and requires a device driver from the manufacture to enable communication with the device type.

The device driver 14 maintains device driver objects 16 to manage the paths and connections to attached devices and LUNs within any of the devices. The device driver objects 16 include one or more queues 20a, 20b . . . 20n queuing I/O requests toward one or more devices managed by the device driver 14, one queue object 22a, 22b . . . 22n for each queue 20a, 20b . . . 20n, one device object 24 for each attached device, and one LUN object 26a, 26b . . . 26n for each LUN in a device. If there are multiple devices each having multiple LUNs, then one LUN object would be maintained for each LUN within each of the devices and one device object 24 would be maintained for each attached device. One path object 28a, 28b is maintained for each path 6a, 6b to the device 4. Each queue 20a, 20b . . . 20n may queue I/O requests in manner known in the art, such as a First-In-First-Out (FIFO) queuing scheme. In the described implementations, one device object 24 may be generated for each instance of a device type, where a device type may comprise a device that is a particular device model or a class of devices from a specific manufacturer or vendor. There may be one device driver 14 for each device type to manage I/O requests to any instance of the device type.

Figure 2:
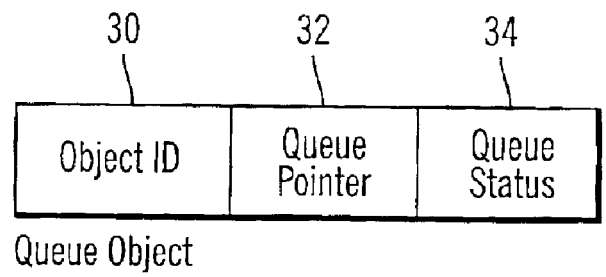
FIGS. 2, 3a, 3b, 4, and 5 illustrate data structures of objects used to manage multiple paths to devices.

FIG. 2 illustrates information maintained within the queue objects 22a, 22b . . . 2n used to manage the queues 20a, 20b . . . 20n. The queue objects 22a, 22b . . . 22n include an object identifier 30 providing a unique identifier of the queue object, a queue pointer 32 providing a pointer or address of the queue 20a, 20b . . . 20n associated with the queue object 22a, 22b . . . 22n in memory, and queue status 34. The queue status 34 may indicate one of the following states:

OK: indicates that one path to the device is available and that I/O requests should be transmitted to the device.

STALLED: indicates that I/O requests directed to a device 4 or LUN 8a, 8b . . . 8n associated with the queue 20a, 20b . . . 20n are to be queued and not transmitted to the target device or LUN.

ABORTING: indicates that all I/Os on the queue 20a, 20b . . . 20n are being aborted.

CANCELLING: indicates that a process is removing an I/O request from the queue 20a, 20b . . . 20n.

DELETED: indicates that the queue is in the process of being destroyed.

Figure 3A:
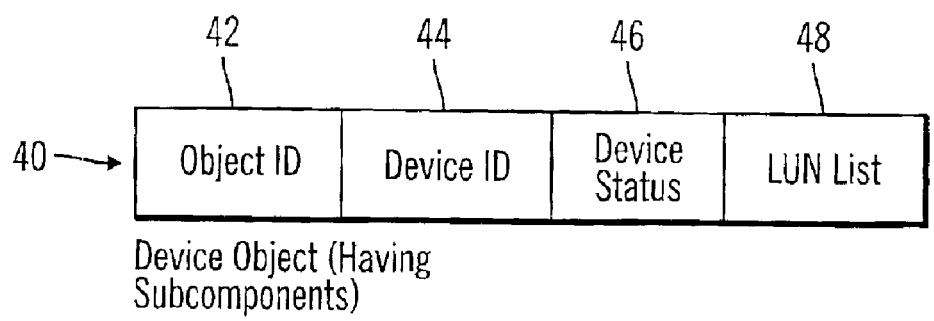

FIG. 3a illustrates information that may be included in a device object 40 for devices having subcomponents, such as the storage device 24 having separate logical devices, such as LUNs 8a, 8b . . . 8n. The device object 40 has an object identifier 42 providing a unique object identifier for the object; a device ID 44 that provides information uniquely identifying the device, such as a unique serial number; a device status field 46 indicating an overall status of the device, e.g., available, unavailable, etc.; and a LUN list 48 identifying the LUN objects 26a, 26b . . . 26n providing information on the logical devices or LUNs 8a, 8b . . . 8n included within the storage device 4. In alternative implementations where the device is not a storage device 4, yet includes separate subcomponents or logical devices that are accessible over separate paths, then the field 48 would include a list of objects for such subcomponents, that would include information similar to that included with the LUN objects 26a, 26b . . . 26n.

Figure 3B:
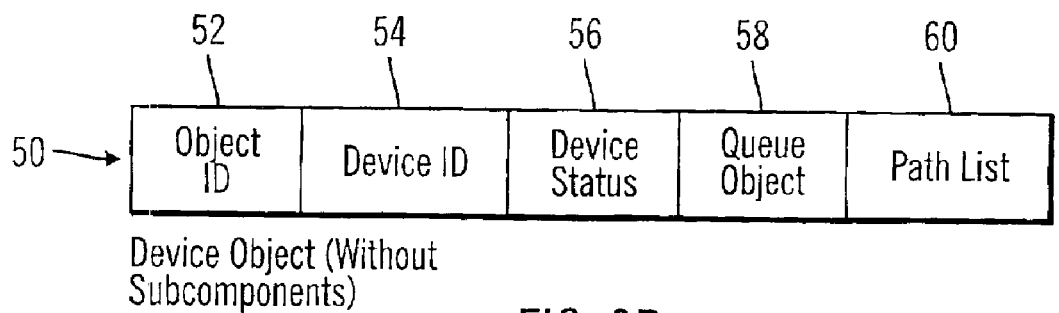

FIG. 3b illustrates information that may be included in a device object 50 for a device that does not have subcomponents. The device object 50 has an object identifier 52 providing a unique object identifier for the device object; a device ID 54 that provides information uniquely identifying the device, such as a unique serial number; a device status field 54 indicating an overall status of the device, e.g., available, unavailable, etc.; a queue object field 58 identifying the queue object 22a, 22b . . . 22n for the queue that queues I/O requests to the device; and a path list 60 providing a list of the path objects providing information on the paths connecting to the device.

Figure 4:
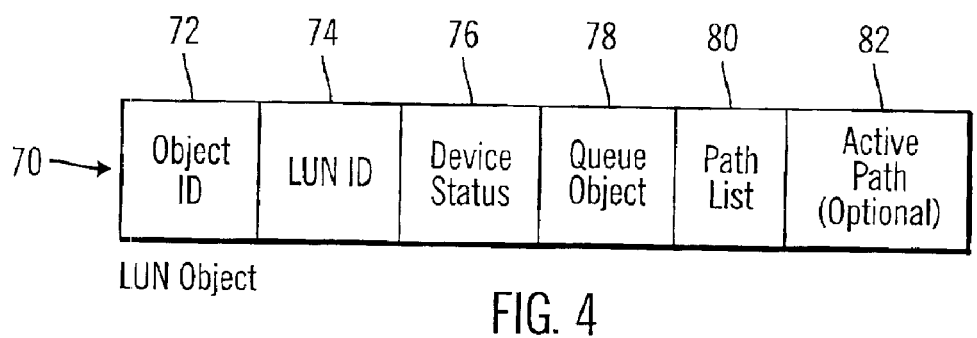

FIG. 4 illustrates information that may be included with the LUN objects 26a, 26b . . . 26n. A LUN object 70 includes an object identifier 72 providing a unique object identifier for the object; a LUN ID 74 provides information identifying the LUN, such as the LUN name the application 10a, 10b . . . 10n would specify with an I/O request; a device status field 76 indicating an overall status of the device, e.g., available, unavailable, etc.; a queue object field 78 identifying the queue object 22a, 22b . . . 22n for the queue that queues I/O requests to the LUN; and a path list 80 providing a list of the path objects providing information on the paths connecting to the device. For devices that may only be accessed on a single path, the LUN object 70 would include an active path field 82 indicating a current path used to access the device. If any of multiple paths may be used to access a device, then any of the available paths may be used. Similarly, the device object 50 for devices without subcomponents may also include an active path field if only one active path may be used to access the device.

Figure 5:
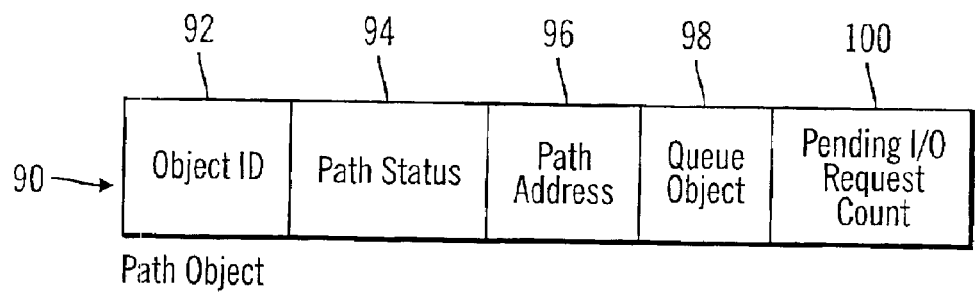

FIG. 5 illustrates information that may be included within the path objects 28a, 28b to provide information on the paths to a device or a logical device or subcomponent therein, such as a LUN. A path object 90 includes an object identifier 92 providing a unique object identifier for the object; a path status field 94 indicating an overall status of the device, e.g., available, unavailable, etc.; a path address field 96 providing information that may be used to address the path, such as a network address, physical address, etc.; a queue object field 98 identifying the queue object 22a, 22b . . . 22n for the queue that queues I/O requests to the path; and a pending I/O request count field 100 indicating the number of pending I/O requests on the path 6a, 6b. In certain implementations, the queue object 98 indicated in the path object 90 may be the same queue object 78 indicated in the LUN object on the path associated with the path object.

The described schema allows for a variety of interrelationships of the components. For instance, any number of queues may be provided. If a single queue is provided for a device, then all subcomponents, e.g., LUNs, of a device and all paths to that device may utilize the single queue. If multiple queues are used by a device, then different devices or device subcomponents, e.g., LUNs, in the device may be assigned to different queues. Below are methods or functions that are used to manage the device driver objects 16:

createQueue( ): creates a queue 20a, 20b . . . 20n and an associated queue object 22a, 22b . . . 22n for the created queue. The queue object 22a, 22b . . . 22n would be initialized with a unique identifier in field 30, a queue pointer 32 is set to the address of the queue created in the host memory, and a queue status 34 of OK.

associateObjectToQueue( ): called with a queue object 22a, 22b . . . 22n and non-queue object, e.g., device 24, LUN 26a, 26b . . . 26n or path 28a, 28b object, to associate the specified object with the specified queue. This operation would update the queue object field 58, 78, 98 in the specified object 50, 70, and 90, respectively, with the identifier of the queue object for the queue that will be used to queue I/O requests to the specified device, LUN, or path.

queueIO( ): is called with parameters of the I/O request and queue object 22a, 22b . . . 22n to queue the specified I/O request on the queue 20a, 20b . . . 20n identified by the specified queue object 22a, 22b . . . 22n.

dequeueIO( ): is called with a queue object 22a, 22b . . . 22n to dequeue an I/O request from the queue 20a, 20b . . . 20n identified in the queue pointer field 32 of the specified queue object 22a, 22b . . . 22n. The I/O request selected for dequeuing would depend on the queuing scheme, e.g., FIFO, Last-in-First-Out (LIFO), etc.

restartQueue( ): is called with a queue object 22a, 22b . . . 22n to initiate processing of all queued I/O requests in the queue 20a, 20b . . . 20n represented by the queue object 22a, 22b . . . 22n specified in the call.

abortQueue( ): called with a queue object 22a, 22b . . . 22n to remove all of the I/O requests on the queue 20a, 20b . . . 20n identified in the queue pointer field 32 of the specified queue object 22a, 22b . . . 22n.

cancelQueue( ): called with an I/O request and queue object 22a, 22b . . . 22n to remove the specified I/O request from the queue 20a, 20b . . . 20n identified in the queue pointer field 32 of the specified queue object 22a, 22b . . . 22n.

setQueueState( ): called with a specified state, e.g., ABORT, OK, STALLED, CANCELLING, DELETED, etc., and a specified queue object 22a, 22b . . . 22n to set the queue status field 34 in the specified queue object 22a, 22b . . . 22n to the specified state.

disassociateObjectFromQueue( ): called with a queue object 22a, 22b . . . 22n and non-queue object, e.g., device 24, LUN 26a, 26b . . . 26n or path 28a, 28b object, to disassociate the specified object with the specified queue. This operation would update the queue object field 58, 78, 98 in the specified object 50, 70, and 98 to remove the identifier of the specified queue object.

destroyQueue( ): called with a queue object 22a, 22b . . . 2n to destroy the specified queue object and queue identified in the queue pointer 32.

Figure 6:
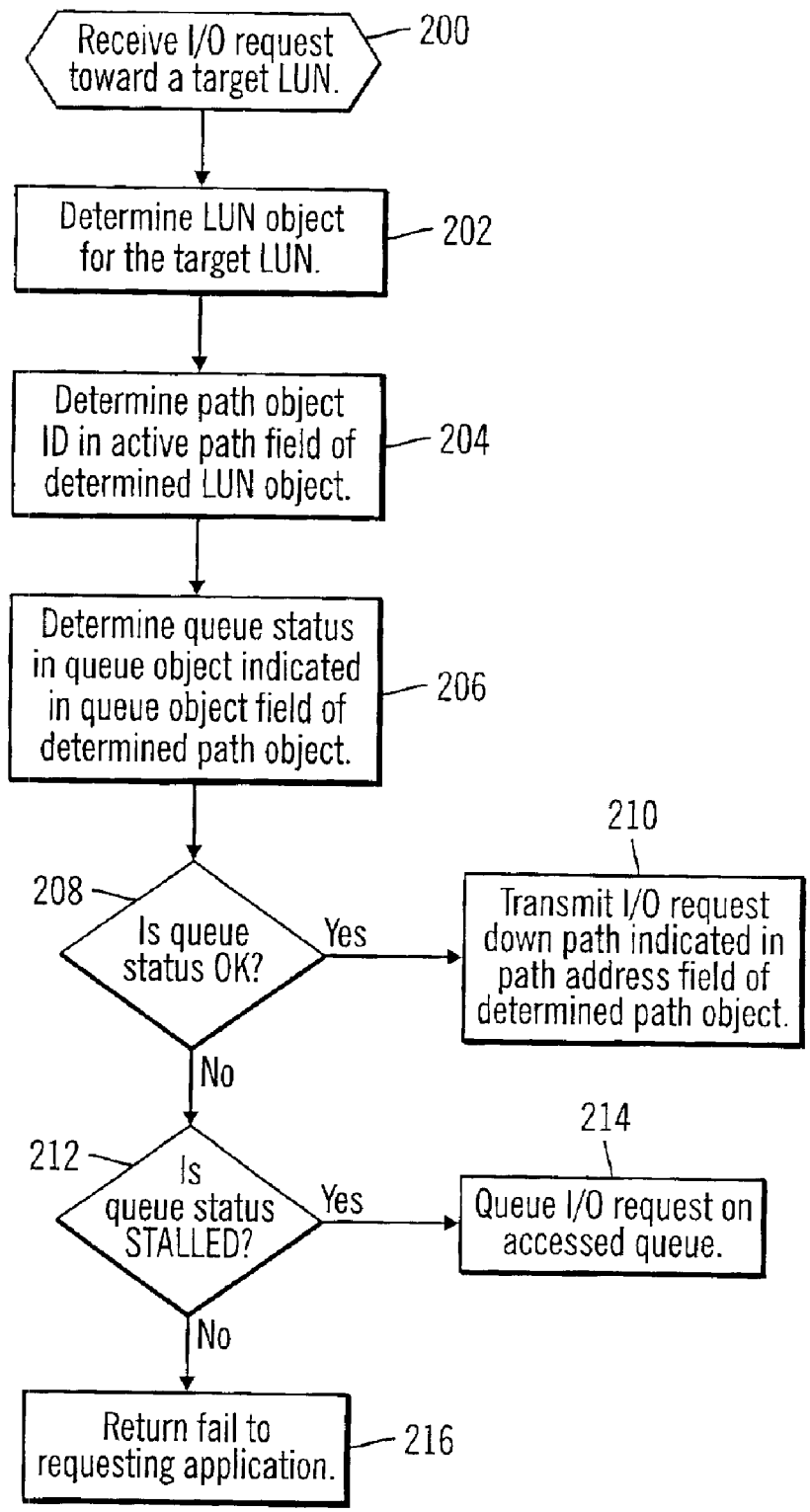
FIG. 6 illustrates logic to process Input/Output (110) requests in accordance with implementations of the invention.

FIG. 6 illustrates logic implemented in the device driver 14 to utilize the device driver objects 16 to manage I/O requests to a subcomponent, such as a LUN 8a, 8b . . . 8n in storage device 4. Control begins at block 200 upon receiving an I/O request from an application 10a, 10b . . . 10n directed toward a target LUN 8a, 8b . . . 8n. In response, the device driver 14 determines (at block 202) the LUN object 26a, 26b . . . 26n for the target LUN, i.e., the LUN object having a LUN ID field 74 (FIG. 4) matching the target LUN. The path object 28a, 28b indicated in the active path field 82 (FIG. 4) is determined (at block 204). Alternatively, if the target LUN can be accessed over any one of multiple paths, then one available path in the path list 80 would be selected. The device driver 14 then determines (at block 206) the queue status 34 in the queue object 22a, 22b . . . 22n indicated in queue object field 98 (FIG. 5) of the determined path object 28a, 28b. Alternatively, the queue object may be determined from the queue object field 58, 78 from the device object 50 or LUN object 70, respectively.

If (at block 208) the queue status is OK, then the device driver 14 transmits (at block 210) the I/O request to the target LUN 8a, 8b . . . 8n on the path indicated in the path address field 96 (FIG. 5) in the determined path object 28a, 28b. If (at block 212) the queue status is STALLED, such as the case during a failover or failback operation of the active path to the target LUN 8a, 8b . . . 8n, then the device driver 14 queues (at block 214) the received I/O request in the queue 20a, 20b . . . 20n indicated in the queue object 22a, 22b . . . 22n. Otherwise, if the queue status 34 is aborting, cancelling or deleted, then fail is returned (at block 216) to the requesting application 10a, 10b . . . 10n.

In implementations where the device does not include separately addressable subcomponents, e.g., LUNs, then the operations described as performed with respect to the LUN object 70 (FIG. 4) in FIG. 6 would be performed with respect to the device object 50 (FIG. 3b) to transmit the I/O request to the target device.

Figure 7:
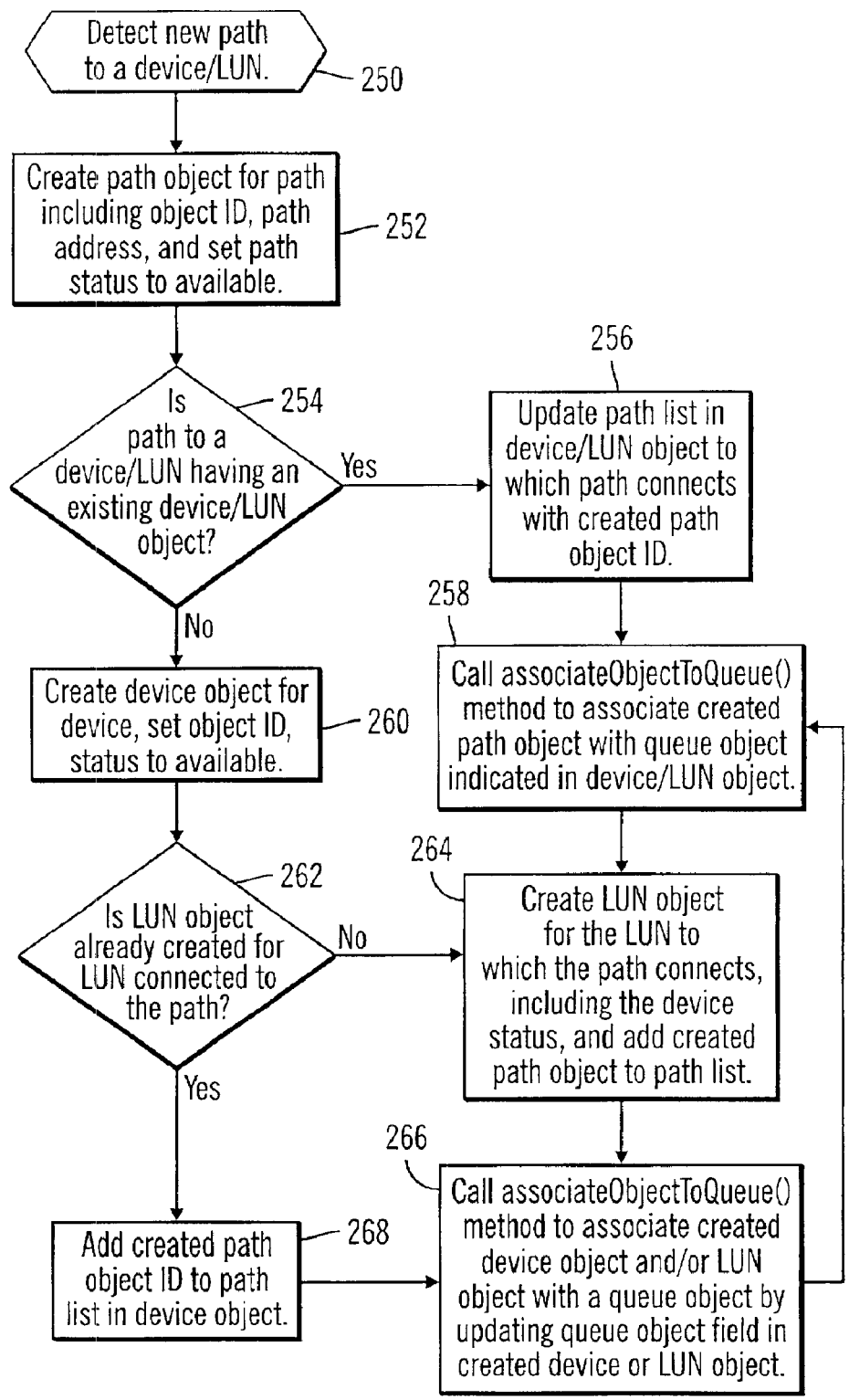
FIG. 7 illustrates logic to generate the objects used to manage paths to attached devices in accordance with implementations of the invention.

FIG. 7 illustrates logic implemented in the device driver 14 to generate the objects when detecting a new path to a device or subcomponent, e.g., LUN. Control begins at block 250 upon detecting the discovery of a path. This detection of the path may happen during an initialization at the host 2 when all paths are detected or a dynamic discovery during host 2 operations. In response, the device driver 14 would create (at block 252) a path object 28a, 28b for the detected path, and set the object ID 92 for the path, the path status 94 to available, the path address 96, and initialize pending I/O request count 100 to zero. If (at block 254) the detected path is to a target LUN/device for which there is an existing LUN/device object 50, 70 then the device driver 14 updates (at block 256) the path list 60, 80 in the existing LUN/device object 50, 70 with the created path object ID. The device driver 14 would further call (at block 258) the associateObjectToQueue( ) method to associate the created path object 28a, 28b with queue object 22a, 22b . . . 2n indicated in the device/LUN object.

If (at block 254) there is no existing LUN/device object 50, 70, then the device driver 14 creates (at block 260) a device object 40, 50 for the device at the end of the detected path, and sets the device status 46, 56 to available and the device ID 44, 54 with a unique identifier of the device. If (at block 262) LUN/device objects 50, 70 have not already been created for the LUN/device connected to this path, then the device driver 14 creates (at block 264) a LUN object 70 (FIG. 4) for the LUN 8a, 8b . . . 8n in the device 4 to which the path 6a, 6b connects, and sets the device status 76 to available and adds the ID of the created path object 28a, 28b to the path list 80. The device driver 14 would further call (at block 266) the associateObjectToQueue( ) method to update the queue object field 78 in the created LUN object 26a, 26b . . . 26n with a queue object 22a, 22b . . . 22n ID for a queue that 20a, 20b . . . 20n that will be used for the device/LUN. From block 266 control proceeds to block 258 to associate the path object with the device/LUN object at the end of the path defined by the path object. If (at block 262) LUN/device objects have been created, then the device driver 14 adds (at block 268) the path object ID of the created path object to the path list 60 of the created device object 50 (FIG. 3a). Control then proceeds to block 266 and 268 to complete updating the interrelationships.

After the initialization of one or all of the paths to one or more instances of a device type, the device driver for that device type is ready to handle I/O requests to the instances of the device type and other operations, such as the failover process described below.

Figure 8:
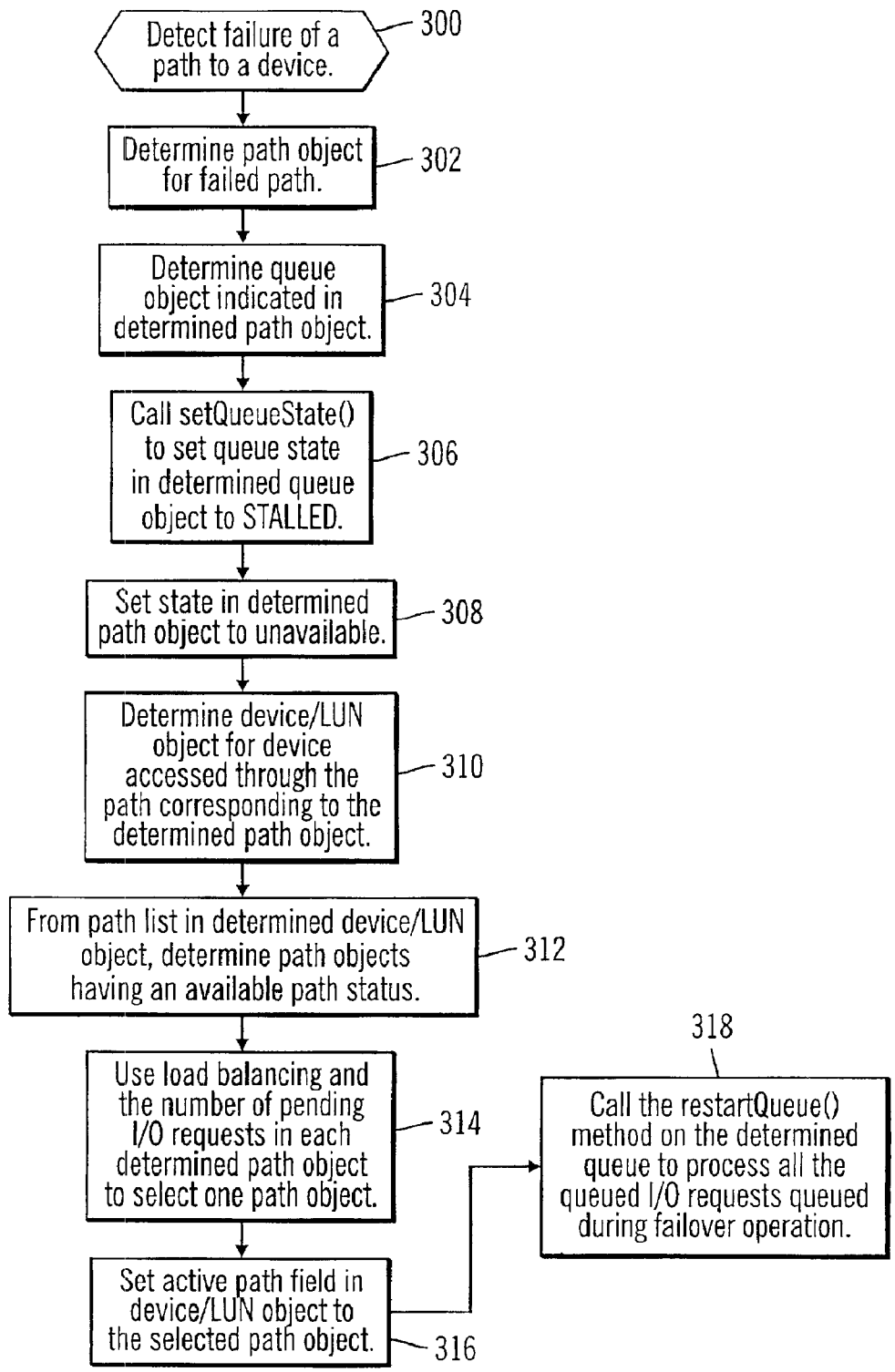
FIG. 8 illustrates logic to handle a failover of a path in accordance with implementations of the invention.

FIG. 8 illustrates logic implemented in the device driver 14 to perform a failover operation. At block 300, the device driver 14 detects a failover of a path 6a, 6b to the device 4 and, in response, determines (at block 302) the path object 28a, 28b for the detected path, i.e., the path object 90 having a path address field 96 matching the address of the failed path. The device driver 14 determines (at block 304) the queue object 22a, 22b . . . 22n indicated in the queue object field 98 (FIG. 5) of the determined path object 28a, 28b and calls (at block 306) the setQueueState( ) function to set the queue status field 34 in the determined path object 28a, 28b to STALLED. The device driver 14 further sets (at block 308) the path status field 94 in the determined path object 28a, 28b to unavailable. The device driver 14 then determines (at block 310) the device/LUN object 50, 70 for the device 4 on the failed path. The device driver 14 then determines (at block 312) from the path list 50, 70 in the determined device/LUN object 50, 70 the path objects for available paths to the device on the failed path. The device driver 14 then applies (at block 314) load balancing techniques known in the art and considers the pending I/O request count 100 in the determined available path objects 90 (FIG. 5) to select one available path object. Alternatively, a path object may be selected in a manner that does not involve load balancing. The active path field 82 in the device/LUN object 50, 70 for the device/LUN on the failed path is set (at block 316) to the selected path object for the new path to use to the device. For certain device types, the device driver 14 may issue failover related commands to the device 4 to configure the device to use the selected alternative path. At block 318, the device driver 14 would call the restartQueue( ) function with the determined queue object 22a, 22b . . . 22n for the queue 20a, 20b . . . 20n used during the failover to start processing all the I/O requests in the queue 20a, 20b . . . 20n indicated in the queue pointer 32 (FIG. 2) field of the determined queue object 22a, 22b . . . 22n.

A failback operation may be performed after a failed path 6a, 6b becomes available. The failback operation would involve many of the same steps in FIG. 8, except at the detection step at block 300, the availability of a previously down path is detected. Further, the now available path would be added to the path list 60, 80, and the path selection process at blocks 312 and 314, using load balancing or some other technique, would consider the previously failed path that is now available.

The described implementations provide techniques for managing multiple paths to devices by defining an object schema for the devices, subcomponents of the devices, e.g., LUNs, paths to the devices/LUNs, and queues for the devices/LUNs. In the described implementations, any number of queues may be used, where a path or device may be defined to share a queue or use different queues. Further, with the described implementations any of the device driver objects may be generated and destroyed dynamically during I/O operations as paths, queues, devices, LUNs, etc., are added or removed from attachment to the host 2.

Using Device Driver Modules to Manage Access to Devices

Figure 10:
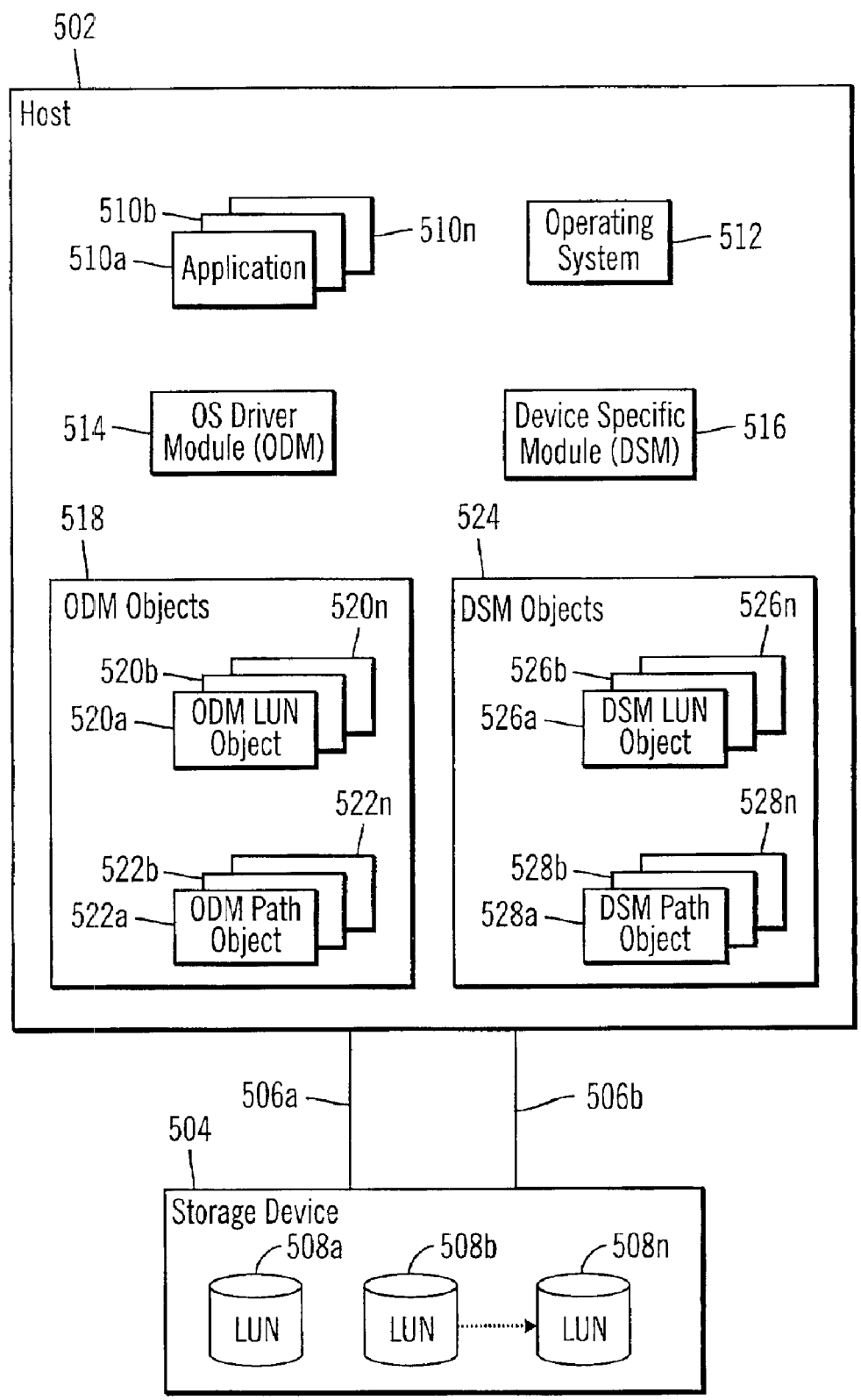
FIG. 10 is a block diagram illustrating a computing environment in which further aspects of the invention are implemented.

FIG. 10 provides further implementation details for the structure of the device driver 14 and objects 16 (FIG. 1) used to manage access to the devices. The implementation of FIGS. 10–14, 15a, 15b, 16a, and 16b provides operating system and device side modules that each maintain separate views of the device driver objects, such as the path objects and LUN objects discussed above. This architecture allows the operating system modules to manage I/O operations without having any device specific information. The device driver modules maintain the device specific information and manages the access to the device.

FIG. 10 shows a host system 502 that connects to a storage device 504 via paths 506a and 506b. There may be additional paths to the storage device 504. The storage device 4 includes a plurality of LUNs 508a, 508b . . . 508n. As discussed, the device with which the host 2 connects may be any I/O device known in the art, which may or may not include logical subcomponents, e.g., the LUNs. The host 502 may be connected to multiple devices. The host 502 includes a plurality of application programs 510a, 510b . . . 510n capable of generating the I/O requests and an operating system 512. In the implementation of FIG. 10, the device driver is implemented in a dual component module architecture of one operating system device module (ODM) 514 that interfaces with the operating system 512 and one or more device specific modules (DSM) 516 (only one is shown) to interface with the device 504. One DSM 516 is provided for each type of device connected to the host 502, where a device type comprises a specific type of device from a particular vendor that is coded to interact with the architecture of the specific device. One DSM 516 may enable interaction with a plurality of instances of a device type. The ODM 514 and DSM 516 comprise code to perform the device driver operations described herein, and may, in certain implementations, comprise classes coded in an object oriented computer language, such as C, C++, Java, etc.

The ODM 514 utilizes ODM objects 518 to perform operating system related operations. The ODM objects 518 include ODM LUN objects 520a, 520b . . . 520n that provide information on each LUN 508a, 508b . . . 508n in the storage device 504 and ODM path objects 522a, 522b . . . 522n that include information on each path 506a, 506b to the storage device 4. The ODM objects 518 may also include queue structures and queue objects, such as the queues 20a, 20b . . . 20n and queue objects 22a, 22b . . . 22n (FIG. 1) discussed above for use during failover operations.

The DSM 516 utilizes DSM objects 524 to interface directly with the device 504 and perform device specific operations. The DSM objects 524 include DSM LUN objects 526a, 526b . . . 526n that provide information on each LUN 508a, 508b . . . 508n in the storage device 504 and DSM path objects 526a, 526b . . . 526n that include information on each path 506a, 506b to the storage device 4. The ODM 514 may maintain one set of ODM objects 518 for each device attached to the host 2 and the DSM 516 may maintain one set of DSM objects 524 for each instance of a device type for which the DSM 516 is provided that is attached to the host 2.

Figure 11:
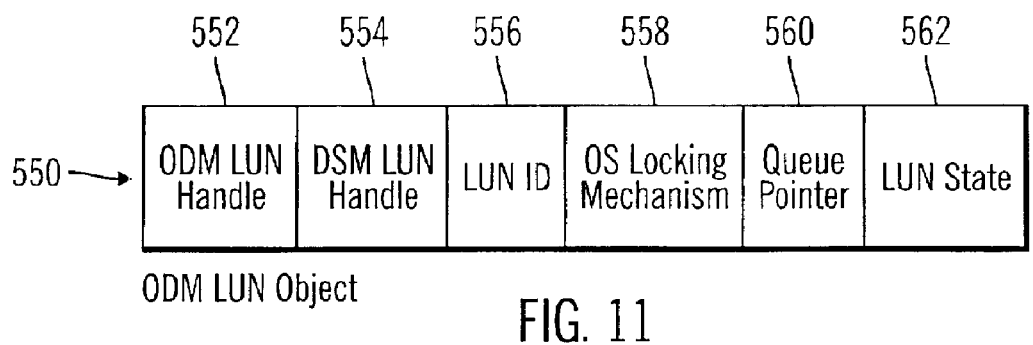
FIGS. 11–14 illustrate data structures used in the computing environment of FIG. 10 in accordance with further implementations of the invention.

FIG. 11 illustrates a data structure 550 of the ODM LUN objects 520a, 520b . . . 520n used to represent LUNs 508a, 508b . . . 508n to the ODM 514. The ODM LUN objects 520a, 520b . . . 520n include an ODM LUN handle 552 that provides a unique identifier used by the ODM 514 to reference the ODM LUN object 520a, 520b . . . 520n; a DSM LUN handle 524 that indicates a unique identifier or reference of the corresponding DSM LUN object 526a, 526b . . . 526n that provides information for the DSM 516 on the LUN 508a, 508b . . . 508n; a LUN ID field 526 providing information identifying the LUN, such as the LUN name the application 10a, 10b . . . 10n would specify with an I/O request; operating system (OS) locking mechanism 528 used by the ODM 514 to lock the ODM LUN object 520a, 520b . . . 520n to avoid access conflicts; a queue pointer 530 pointing to the queue 20a, 20b . . . 20n (FIG. 1) used to queue requests for the LUN during a failover or failback or other operation requiring queuing; and a LUN state 532 indicating a current operational status of the LUN 508a, 508b . . . 508n, e.g., available, not available, etc.

Figure 12:
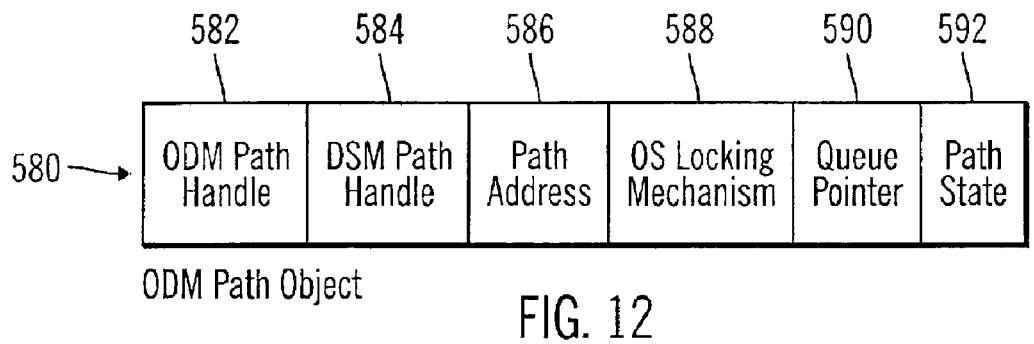

FIG. 12 illustrates information maintained in the ODM path objects 522a, 522b . . . 522n to provide information on paths 506a, 506b to the LUNs 508a, 508b . . . 508n, or other device or logical device or subcomponent. The ODM path object 580 includes an ODM path handle 582 that provides a unique identifier or reference for the ODM path object 522a, 522b . . . 522n that the ODM 514 uses; a DSM path handle 584 that indicates a unique identifier or reference of the corresponding DSM path object 528a, 528b . . . 528n that provides information for the DSM 516 on the LUN 508a, 508b . . . 508n; a path address field 586 providing information to communicate with the path to the device 504; an operating system (OS) locking mechanism 588 used by the ODM 514 to lock the ODM path object 522a, 522b . . . 522n to avoid access conflicts; a queue pointer 590 pointing to the queue 20a, 20b . . . 20n (FIG. 1) used to queue requests for the path; and a path state 592 indicating a current operational status of the path 506a, 506b, e.g., available, not available, etc.

Figure 13:
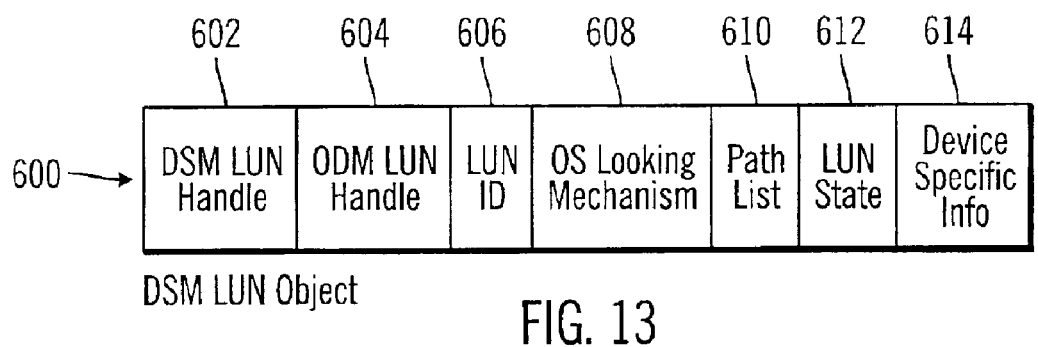

FIG. 13 illustrates information maintained in the DSM LUN object 600 that represents one LUN 508a, 508b . . . 508n to the DSM 516. Thus, there is one DSM LUN object 600 for each LUN 508a, 508b . . . 508n. The DSM LUN objects 526a, 526b . . . 526n include a DSM LUN handle 602 that provides a unique identifier or reference for the DSM LUN object 526a, 526b . . . 526n; an ODM LUN handle 604 that indicates a unique identifier or reference of the corresponding ODM LUN object 520a, 520b . . . 520n that provides information on the LUN 508a, 508b . . . 508n to the ODM 514; a LUN ID field 606 providing information identifying the LUN, such as the LUN name the application 10a, 10b . . . 10n would specify with an I/O request; an operating system (OS) locking mechanism 608 used by the DSM 516 to lock the DSM LUN object 526a, 526b . . . 526n to avoid access conflicts; a path list 610 providing a list of handles of DSM path objects 528a, 528b . . . 528n representing paths providing access to the LUN; a LUN state 612 indicating a current operational status of the LUN 508a, 508b . . . 508n, e.g., available, not available, etc.; and device specific information 614 for the LUN, which the DSM 516 would use to access and communicate with the LUN. The device specific information 614 may include specific information on the device 504 configuration and architecture.

Figure 14:
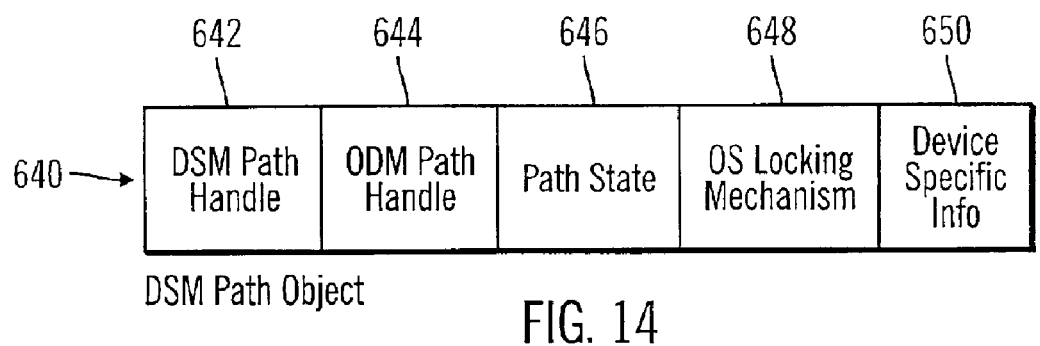

FIG. 14 illustrates a data structure 640 of the DSM path objects 528a, 528b . . . 528n to provide information to the DSM 516 on paths 506a, 506b to the LUNs 508a, 508b . . . 508n, or other device or logical device or subcomponent. The DSM path object 640 (shown as 528a, 528b . . . 528n in FIG. 10) includes a DSM path handle 642 that provides a unique identifier or reference for the DSM path object 528a, 528b . . . 528n; an ODM path handle 644 that indicates a unique identifier or reference of the corresponding ODM path object 522a, 522b . . . 522n that provides information for the ODM 514 on the LUN 508a, 508b . . . 508n; a path state 646 indicating a current operational status of the path 506a, 506b, e.g., available, not available, etc.; an operating system (OS) locking mechanism 648 used by the DSM 516 to lock the DSM path object 528a, 528b . . . 528n to avoid access conflicts; and device specific information 650 for the path 506a, 506b, which the DSM 516 would use to access and communicate on the path 506a, 506b represented by the DSM path object.

The ODM and DSM LUN objects shown in FIGS. 11 and 13 provide information for storage devices that include logical devices, such as LUNs. However, the information provided in the ODM and DSM LUN objects may be provided for any logical devices or separately addressable subcomponents within a device.

Figure 15A:
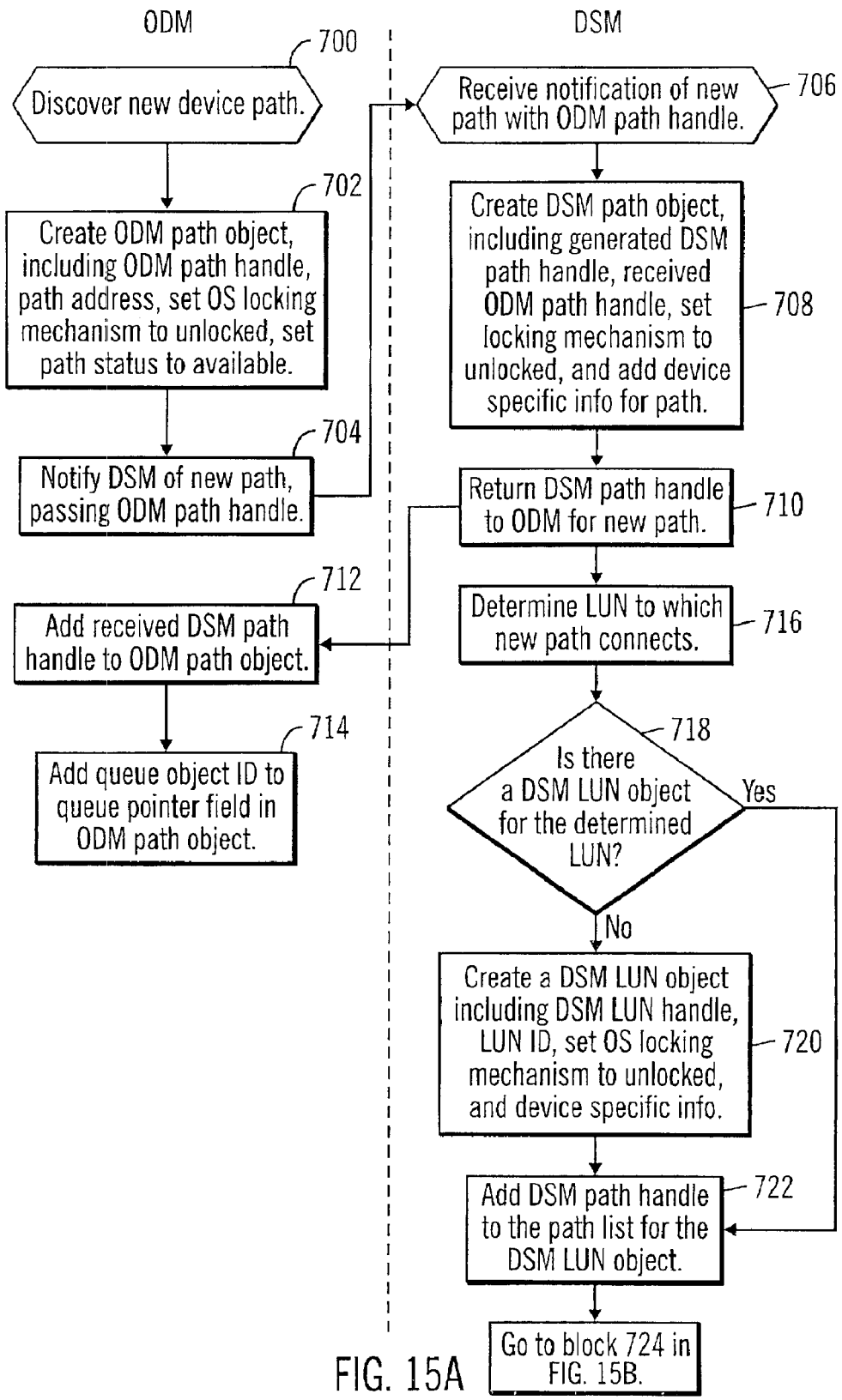
FIGS. 15a and 15b illustrate logic to generate objects used to manage paths in accordance with further implementations of the invention.
Figure 15B:
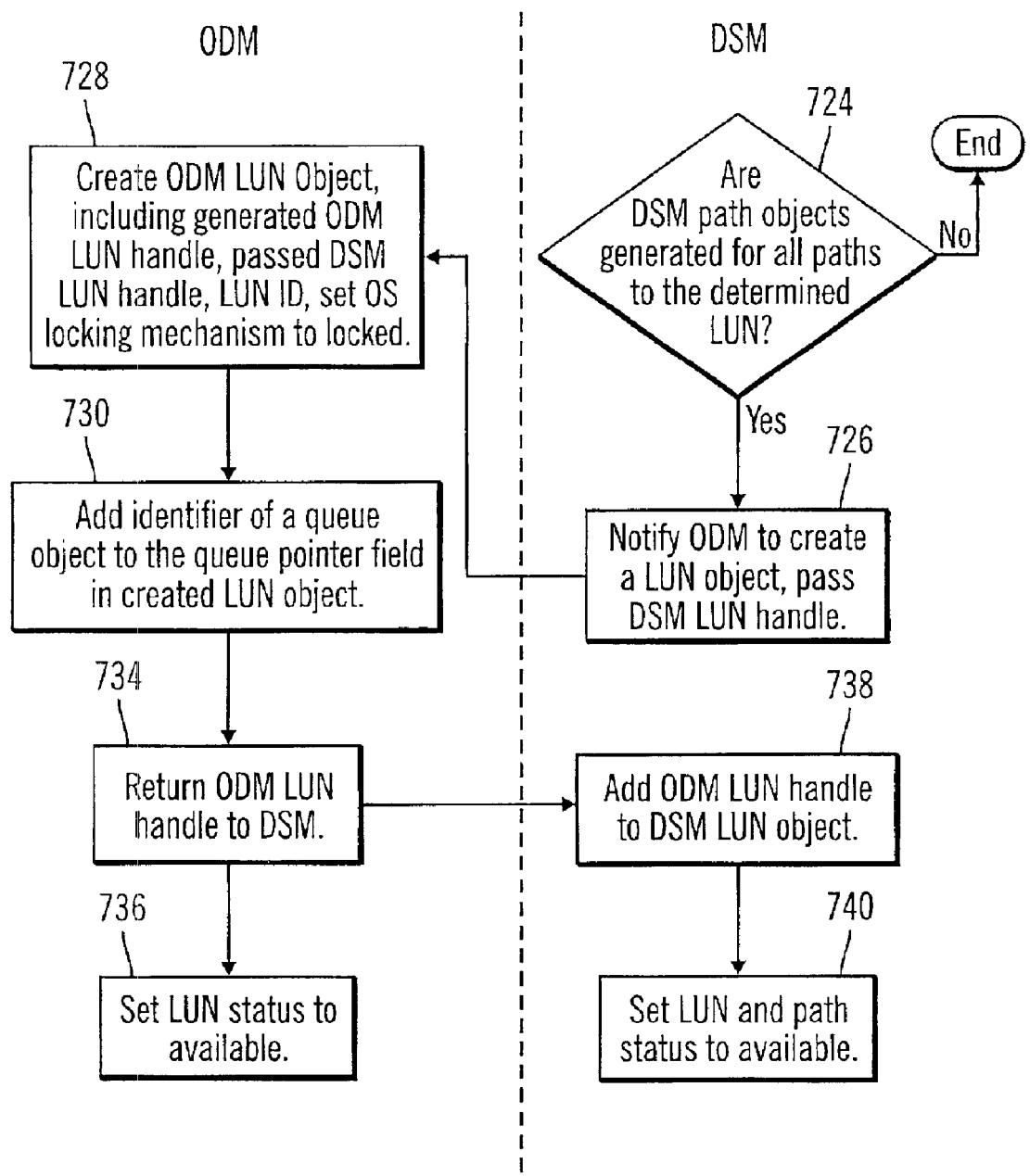

FIGS. 15a and 15b illustrate logic implemented in the ODM 514 and DSM 516 to generate the ODM 518 and DSM 524 objects, which may occur during initialization of the host 502 or in response to detection of new paths, devices, LUNs, etc. With respect to FIG. 15a, control begins at block 700 with the ODM 514 being notified by the operating system 512 of a new device path 506a, 506b. In response, the ODM 514 creates (at block 702) an ODM path object 580 (FIG. 12), including a generated ODM path handle 582, adds the path address to the path address field 586, sets the locking mechanism field 588 to unlocked, and sets the path status 592 to available. The ODM 514 notifies (at block 704) the DSM 516 of the new path and passes the ODM path handle 582 generated for the new ODM path object 580 with the notification. In response to receiving (at block 706) notification of the new path with the ODM path handle, the DSM 516 creates (at block 708) a DSM path object 640 (FIG. 14), includes the passed ODM path handle in field 644, generates a DSM path handle 642 for the new DSM path object and adds the generated DSM path handle to field 642, sets the locking mechanism field 588 to unlocked, and adds device specific info to field 650 specific to the particular device 504. This device specific information may be included in the DSM 516 code by the vendor of the device that distributes the DSM 516.

After creating the DSM path object 640, the DSM 516 returns (at block 710) the DSM path handle created for the new path to the ODM 514. In response, the ODM 514 adds (at block 712) the received DSM path handle to field 584 in the created ODM path object 580. The ODM 514 may further add (at block 714) a queue object identifier to the queue pointer field 590 of the ODM path object 580 for the new path as discussed above to indicate the queue, such as queues 20a, 20b . . . 20n (FIG. 1) to queue I/O requests for that path during failover and failback operations as discussed above. At block 716, the DSM 516 determines the LUN 508a, 508b . . . 508n to which the new path connects. If (at block 718) a DSM LUN object 600 was not generated for the determined LUN, i.e., the identifier of the determined LUN does not match the LUN ID in field 606 of one of the existing DSM LUN objects 526a, 526b . . . 526n, then the DSM 516 creates a DSM LUN object 600 (FIG. 13) for the determined LUN, and includes a generated DSM LUN handle in field 602 for the new DSM LUN object 600, adds the LUN ID to field 606, sets the locking mechanism 608 to unlocked, and adds any device specific information to field 614. From block 720 or the no branch of block 718, control proceeds to block 722 where the DSM 516 adds the DSM path handle for the new path to the path list field 610 in the DSM LUN object 526a, 526b . . . 526n for the determined LUN.

With respect to FIG. 15b, the DSM 516 determines (at block 724) whether the DSM path objects 528a, 528b . . . 528n are generated for all paths to the determined LUN 508a, 508b . . . 508n. To make this determination, the DSM 516 would determine all DSM objects 528a, 528b . . . 528n included in the path list 610 of the DSM LUN object 526a, 526b . . . 526n for the determined LUN. The device specific information in field 614 of the DSM LUN object 526a, 526b . . . 526n for the determined LUN or other information maintained by the DSM 516 may indicate the number of paths to the determined LUN the device 504 may have, which may then be compared with the number of determined DSM path objects 528a, 528b . . . 528n to the determined LUN in the path list 610. If (at block 724) all paths possible to the determined LUN have been detected, i.e., DSM path objects 528a, 528b . . . 528n have been generated for all possible paths to the determined LUN, then the DSM 516 notifies (at block 726) the ODM 514 to create an ODM LUN object 550 for the determined LUN and passes the DSM LUN handle for the determined LUN with the notification. Otherwise, if not all paths to the determined LUN have been detected, then control ends. With the logic of FIG. 15b, the ODM 514 does not generate a LUN object until all DSM and ODM path objects have been generated for all paths to the determined LUN. In alternative implementations, the ODM 514 may generate the ODM LUN object after only one or less than all paths to the LUN are detected.

Upon receiving the notification to create a LUN object with the DSM LUN object path handle, the ODM 514 creates (at block 728) an ODM LUN object 550 (FIG. 11) and includes a generated ODM LUN handle into field 552 for the new ODM LUN object, adds the passed DSM LUN handle to field 554, adds the LUN ID to field 556, and sets the locking mechanism field 558 to unlocked. The ODM 514 further adds (at block 730) a queue object identifier for a queue to the queue pointer field 560 in the ODM LUN object 550 to indicate a queue, such as queues 20a, 20b . . . 20n (FIG. 1), to queue I/O requests in the event of a failover or failback. In certain implementations, the ODM path objects 522a, 522b . . . 522n may be associated with the same queue that is associated with the ODM LUN object for the LUN to which the paths corresponding to such ODM path objects 522, 522b . . . 522n connect. The ODM 514 then returns (at block 734) the ODM LUN handle 552 for the created ODM LUN object 550 to the DSM 516 and sets (at block 736) the LUN state in field 562 for the newly created ODM LUN object 550 to available. In response to receiving (at block 738) the ODM LUN handle from the ODM 514, the DSM 516 adds the received ODM LUN handle to field 604 (FIG. 13) of the DSM LUN object 526a, 526b . . . 526n for the determined LUN. The DSM 516 further sets (at block 740) the LUN state 612 to available.

Figure 16A:
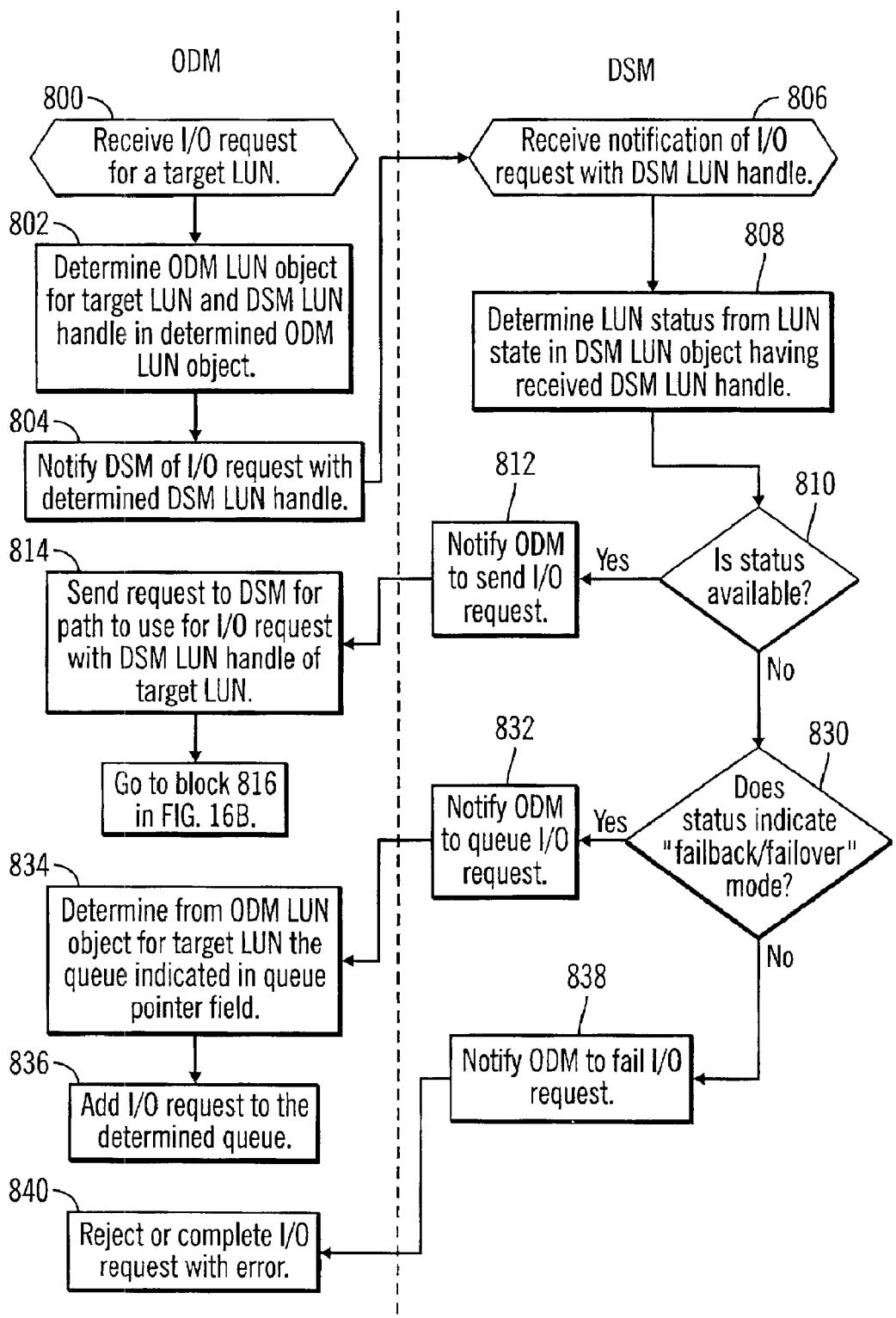
FIGS. 16a and 16b illustrate logic to manage I/O requests in accordance with further implementations of the invention.
Figure 16B:
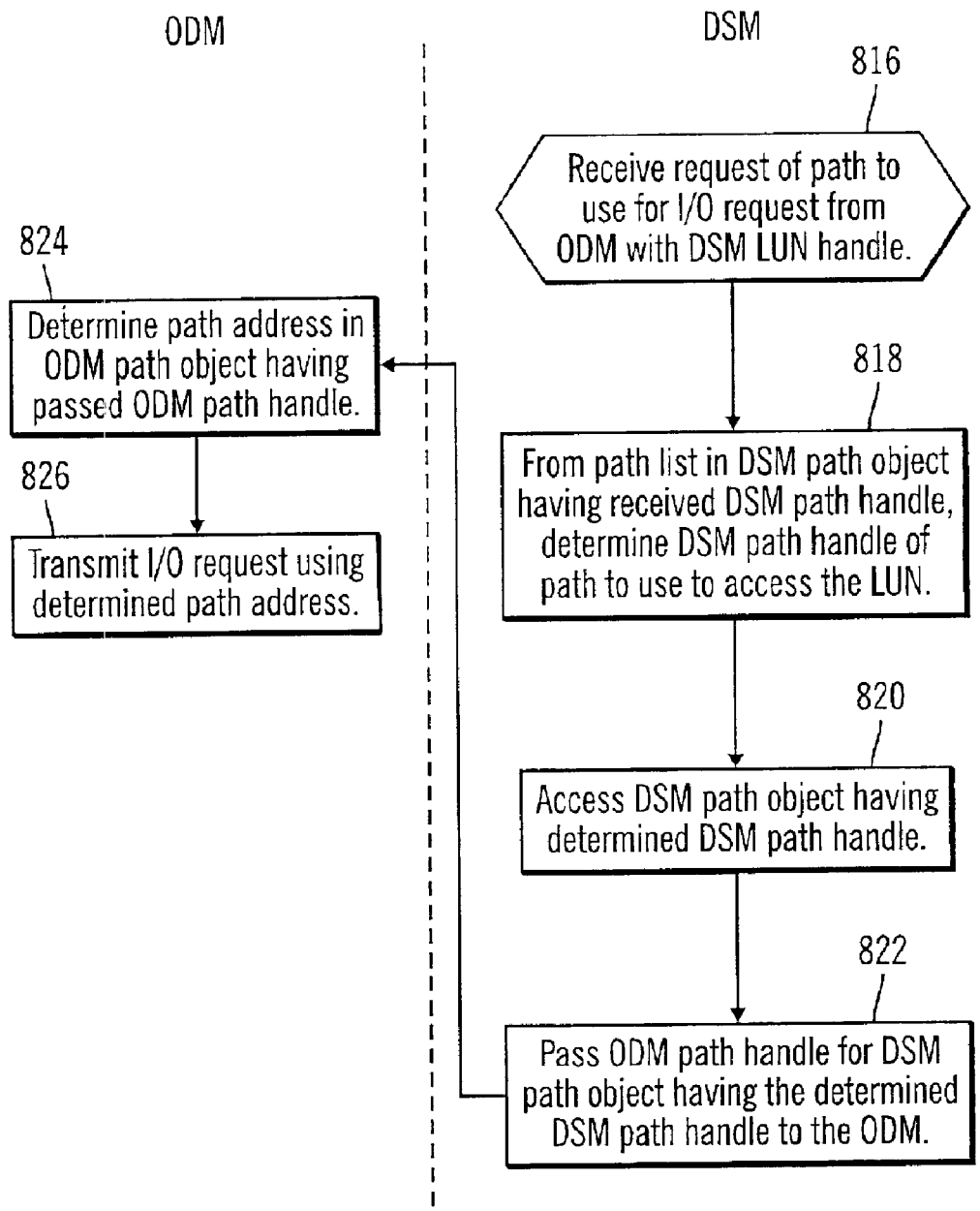

FIGS. 16a and 16b illustrate logic implemented in the ODM 514 and DSM 516 to handle I/O requests to a LUN 508a, 508b . . . 508n after the ODM 518 and DSM 524 objects have been generated with the logic of FIGS. 15a, 15b. Control begins at block 800 in FIG. 16a when the ODM 514 receives an I/O request directed toward a target LUN 508a, 508b . . . 508n. In response, the ODM 514 determines (at block 802) the ODM LUN object 520a, 520b . . . 520n for the target LUN 508a, 508b . . . 508n and determines the DSM LUN handle 554 (FIG. 11) in the determined ODM LUN object 520a, 520b . . . 520n. The ODM LUN object 520a, 520b . . . 520n for the target LUN would have a LUN ID 556 (FIG. 11) matching the identifier of the target LUN. The ODM 514 then notifies (at block 804) the DSM 516 of the I/O request with the determined DSM LUN handle in field 554 for the target LUN 508a, 508b . . . 508n. Upon receiving (at block 806) the notification of the I/O request with the DSM LUN handle 554, the DSM 516 determines (at block 808) the LUN status from the LUN state field 612 in the DSM LUN object 526a, 526b . . . 526 having the received DSM LUN handle in field 602 (FIG. 13). At this point, the DSM 516 may query the device 504 using the device specific information to determine the current status of the device 504 and update the LUN state field 612.

If (at block 810) the determined status is available, then the DSM 516 notifies (at block 812) the ODM 514 to send the I/O request. In response to such notification, the ODM 514 sends (at block 814) a request to the DSM 516 for the path 506a, 506b to use for the I/O request with the DSM LUN handle in the ODM LUN object 520a, 520b . . . 520n for the target LUN. Control then proceeds to block 816 in FIG. 16b where the DSM 516, in response to the request for the path to use, determines (at block 818), from the path list 610 (FIG. 13) in the DSM LUN object 526a, 526b . . . 526n having the passed DSM LUN handle in field 602, the DSM path handle 642 (FIG. 14) of the path to use. The path to use may be a specified active path, such as through the use of an active path field, such as the active path field 82 (FIG. 4) described above. Alternatively, if any available path in the path list 610 may be used to access the target LUN 508a, 508b . . . 508n, then the DSM 516 may perform load balancing to select a least used path for the current I/O request. The DSM 516 then accesses (at block 820) the DSM path object 528a, 528b . . . 528n having the determined DSM path handle from the path list 610. The DSM 516 then passes (at block 822) the ODM path handle in field 644 (FIG. 14) in the accessed DSM path object 528a, 528b . . . 528n to the ODM 514, which identifies the path 506, 506b to use for the I/O request. In response, the ODM 514 determines (at block 824) the path address 586 (FIG. 12) in the ODM path object 522a, 522b . . . 522n having the ODM path handle passed by the DSM 516 in field 582. The ODM 514 or operating system 512 then transmits (at block 826) the I/O request to the path 506a, 506b identified in the determined path address 586.

If (at block 830 in FIG. 16a) the determined LUN status in the state field 612 (FIG. 13) indicates that the LUN is involved in a failover or failback operation, then the DSM 516 notifies (at block 832) the ODM 514 to queue the I/O request. In response, the ODM 514 determines (at block 834) from the ODM LUN object 520a, 520b . . . 520n for the target LUN the queue object, such as queue objects 22a, 22b . . . 22n discussed above with respect to FIG. 1, indicated in the queue pointer field 560 of the ODM LUN object 520a, 520b . . . 520n. The ODM 514 then adds (at block 836) the I/O request to the queue, such as one of queues 20a, 20b . . . 20n discussed above with respect to FIG. 1, that are indicated in the determined queue object.

If (at block 830) the status indicates the device 504 or target LUN 508a, 508b . . . 508n is unavailable, then the DSM 516 notifies (at block 838) the ODM 516 to fail the I/O request. In response, the ODM 514 rejects or completes the I/O request with an error.

The implementation of FIGS. 10–14, 15a, 15b, 16a, and 16b divides the driver functionality into two modules, an operating system module (ODM) and device specific module (DSM). The ODM interfaces with the operating system and handles operating system related operations that are not device specific. The ODM may handle operations for different device types or instances of a same device. The DSM handles the device specific operation. In this way, vendors may provide DSM modules for use with their devices that can be immediately deployed and used with the ODM. The different device vendors would just have to include in their DSM objects 524 those fields that are always used by the ODM 514, and device specific information in the device specific fields. By placing the burden of some of the device driver operations on the ODM, the vendor is relieved from having to code the ODM functionality, and only needs to use the necessary fields and objects, and code the operations the DSM performs. Further, by separating the operating system and device specific operations in the described implementations, the ODM does not need knowledge of the device or the number of paths to the device. With the described implementations, the ODM seeks a path to use, regardless of the device. Further, the DSM does not need any specific knowledge of the I/O mechanics of the operating system 12 because that is handled by the ODM. This reduces the coding the device vendor needs to perform.

The locking mechanisms in the ODM and DSM objects are used to lock the objects when they are being accessed when processing I/O requests. This locking feature is particularly useful in multiprocessor systems to prevent multiple processors from performing conflicting operations with respect to the objects when handling I/O requests.

Additional Implementation Details

The device and path management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain implementations, the device being accessed comprises a storage device 4 having LUNs. Alternatively, the accessed device represented by a device object and associated with queue and path objects may comprise a storage device not having separately addressable LUNs or may be any type of I/O device known in the art, with or without separately addressable subcomponents.

In the described implementations, the management of the objects was performed by a device driver 14 managing access to the multiple paths to the devices. In alternative implementations, some or all of the operations described as performed by the device driver may be performed by other program components in the host, such as the applications or operating system.

With the described object schema, certain information was described as included in particular types of objects, e.g., device objects, LUN objects, queue objects, etc. In alternative implementations, information described as included in one object type may be included in a different object type.

The described FIG. 1 shows two paths to one device. However, the host may be connected to multiple devices and have one or more paths to each connected device.

The objects may comprise any data structure known in the art, included in volatile or non-volatile memory, such as a file, object, table, etc.

The logic of FIGS. 6–8, 15a, 15b, 16a, and 16b describes specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 9:
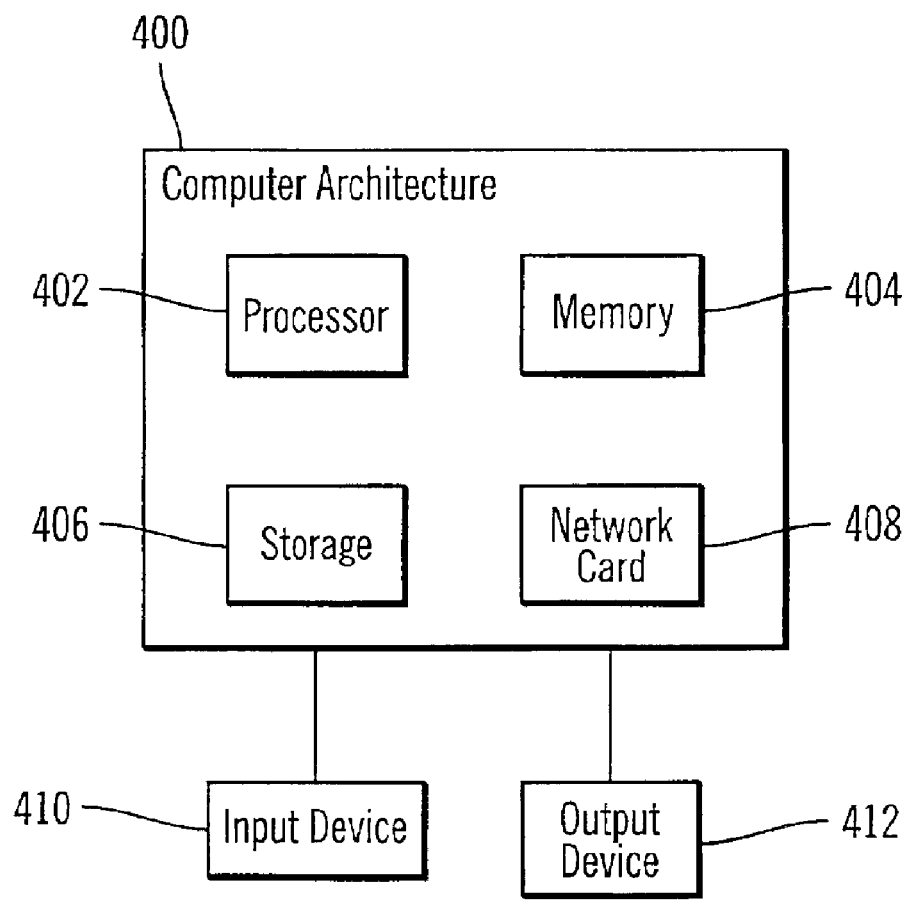
FIG. 9 illustrates a computer architecture that may be used with the systems shown in FIG. 1, such as the host and storage device, in accordance with certain implementations of the invention.

FIG. 9 illustrates one implementation of the architecture of the host 2. The system 2 may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 4206 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 502, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

Certain of the operations described as performed by the ODM 514 may be performed by the DSM 516, and vice versa. Further, the ODM objects 518 and DSM objects 524 may include additional, different or fewer fields than those described with respect to FIGS. 11–14, as well as any fields described with respect to FIGS. 2, 3a, 3b, 4 and 5. The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for handling Input/Output (I/O) requests to a target device, comprising:
   receiving an I/O request directed toward the target device;
   determining a first device object associated with the target device;
   determining from a second device object associated with the target device whether the device is available, wherein the first and second device objects provide information on the target device and wherein a first path object and second path object provide information on one path to the device;
   determining a path to the target device; and
   transmitting the I/O request on the determined path to the target device if the device is determined to be available.

2. The method of claim 1, wherein determining the path further comprises:
   determining from the second device object associated with the target device one second path object; and
   determining from the first path object information to transmit the I/O request to the target device using the path associated with the first and second path objects.

3. The method of claim 2, wherein there are a plurality of first and second path objects associated with different paths to the device, and wherein the second device object indicates a plurality of second path objects providing information on the paths to the device.

4. The method of claim 3, further comprising:
   using load balancing to select one second path object from the plurality of second path objects associated with the second device object.

5. The method of claim 1, wherein there are a plurality of first and second device objects associated with different devices.

6. A method for handling Input/Output (I/O) requests to a target device, comprising:
   receiving an I/O request directed toward the target device;
   determining a first device object associated with the target device;
   determining from a second device object associated with the target device whether the device is available, wherein the first and second device objects provide information on the target device;
   determining a path to the target device; and
   transmitting the I/O request on the determined path to the target device if the device is determined to be available, wherein a first program module performs the steps of receiving the I/O request and determining the first device object, and a second program module performs the steps of determining from the second device object whether the device is available and determining the path to the target device, and wherein the method further comprises:
   transmitting, by the first program module, a device availability request to the second program module to determine whether the target device is available; and
   returning, by the second program module, indication of whether the target device is available.

7. The method of claim 6, further comprising:
   returning, by the second program module, a message to queue the I/O request if the device is not available; and
   queuing, by the second program module, the I/O request in response to the message.

8. The method of claim 6, wherein there are a plurality of first and second path objects associated with different paths to the device, and wherein the second device object indicates a plurality of second path objects providing information on the paths to the device, further comprising:
   transmitting, by the first program module, a path request to the second module after receiving indication that the target device is available;
   selecting, by the second program module, a second path object indicated in the second device object in response to the path request;
   returning, by the second program module, a path handle associated with the selected second path object to the first program module; and
   using, by the first program module, the path handle to determine the first path object associated with the path represented by the selected second path object, wherein the I/O request is transmitted on the path indicated in the determined first path object.

9. A method for representing a plurality of paths to at least one device, comprising:
   detecting paths to a device;
   for each detected path, generating a first path object and second path object providing information on the path;
   for each at least one device, generating a first device object and second device object; and
   indicating in the second device object each path to the device, wherein the first path object is generated by a first program module and the second path object is generated by a second program module, wherein the first program module generates the first path object after detecting the path to the device, and the method further comprises:
   transmitting, by the first program module, an identifier of the first path object for one detected path to the second program module, wherein the second program module generates the second path object after receiving the transmitted identifier; and
   including, by the second program module, the transmitted identifier in the second path object for the device.

10. The method of claim 9, further comprising:
    transmitting, by the second program module, an identifier of the second path object to the first program module; and
    including, by the first program module, the transmitted identifier from the second program module in the first path object.

11. A method for representing a plurality of paths to at least one device, comprising:
    detecting paths to a device;
    for each detected path, generating a first path object and second path object providing information on the path;
    for each at least one device, generating a first device object and second device object; and indicating in the second device object each path to the device, wherein the first path object and first device object are generated by a first program module and the second path object and second device object are generated by a second program module, and wherein the method further comprises:

determining, by the second program module, whether second path objects have been generated for all possible paths to the device; and notifying, by the second program module, the first program module to generate the first device object for the device, wherein the first program module generates the first device object in response to the notification.

12. A system for handling Input/Output (I/O) requests to a target device, comprising:

a computer readable medium;

means for receiving an I/O request directed toward the target device;

means for determining a first device object in the computer readable medium associated with the target device;

means for determining from a second device object, in the computer readable medium, associated with the target device whether the device is available, wherein the first and second device objects provide information on the target device and wherein a first path object and second path object provide information on one path to the device;

means for determining a path to the target device; and means for transmitting the I/O request on the determined path to the target device if the device is determined to be available.

13. The system of claim 12, wherein there are a plurality of first and second path objects in the computer readable medium associated with different paths to the device, and wherein the second device object indicates a plurality of second path objects providing information on the paths to the device.

14. The system of claim 12, wherein there are a plurality of first and second device objects in the computer readable medium associated with different devices.

15. A system for handling Input/Output (I/O) requests to a target device, comprising:

a computer readable medium;

means for receiving an I/O request directed toward the target device;

means for determining a first device object in the computer readable medium associated with the target device;

means for determining from a second device object, in the computer readable medium, associated with the target device whether the device is available, wherein the first and second device objects provide information on the target device;

means for determining a path to the target device; and means for transmitting the I/O request on the determined path to the target device if the device is determined to be available, wherein a first program module includes the means for receiving the I/O request and determining the first device object, and a second program module includes the means for determining from the second device object whether the device is available and the means for determining the path to the target device, and wherein:

the first program module transmits a device availability request to the second program module to determine whether the target device is available; and the second program module returns an indication of whether the target device is available.

16. A system for representing a plurality of paths to at least one device, comprising:

a computer readable medium;

means for detecting paths to a device;

means for generating, for each detected path, a first path object and second path object in the computer readable medium providing information on the path;

means for generating, for each at least one device, a first device object and second device object in the computer readable medium; and means for indicating in the second device object each path to the device, wherein the means for generating the first path object comprises a first program module and the means for generating the second path object comprises a second program module, wherein the first program module generates the first path object after detecting the path to the device, and wherein:

the first program module transmits an identifier of the first path object for one detected path to the second program module, the second program module generates the second path object after receiving the transmitted identifier; and the second program module includes the transmitted identifier in the second path object for the device.

17. A system for representing a plurality of paths to at least one device, comprising:

a computer readable medium;

means for detecting paths to a device;

means for generating, for each detected path, a first path object and second path object in the computer readable medium providing information on the path;

means for generating, for each at least one device, a first device object and second device object in the computer readable medium; and means for indicating in the second device object each path to the device, wherein the means for generating the first path object and first device object comprises a first program module and the means for generating the second path object and second device object comprises a second program module, and wherein:

the second program module determines whether second path objects have been generated for all possible paths to the device; and the second program module notifies the first program module to generate the first device object for the device, wherein the first program module generates the first device object in response to the notification.

18. An article of manufacture for handling Input/Output (I/O) requests to a target device, wherein the article of manufacture is capable of causing operations to be performed, wherein the operations comprise:

receiving an I/O request directed toward the target device;

determining a first device object associated with the target device;

determining from a second device object associated with the target device whether the device is available, wherein the first and second device objects provide information on the target device and wherein a first path object and second path object provide information on one path to the device;

determining a path to the target device; and transmitting the I/O request on the determined path to the target device if the device is determined to be available.

19. The article of manufacture of claim 18, wherein a first path object and second path object provide information on one path to the device, and wherein determining the path further comprises:

determining from the second device object associated with the target device one second path object; and determining from the first path object information to transmit the I/O request to the target device using the path associated with the first and second path objects.

20. The article of manufacture of claim 19, wherein there are a plurality of first and second path objects associated with different paths to the device, and wherein the second device object indicates a plurality of second path objects providing information on the paths to the device.

21. The article of manufacture of claim 20, further comprising:

using load balancing to select one second path object from the plurality of second path objects associated with the second device object.

22. The article of manufacture of claim 18, wherein there are a plurality of first and second device objects associated with different devices.

23. An article of manufacture for handling Input/Output (I/O) requests to a target device, wherein the article of manufacture is capable of causing operations to be performed, wherein the operations comprise:

receiving an I/O request directed toward the target device;

determining a first device object associated with the target device;

determining from a second device object associated with the target device whether the device is available, wherein the first and second device objects provide information on the target device;

determining a path to the target device; and transmitting the I/O request on the determined path to the target device if the device is determined to be available, wherein a first program module performs the steps of receiving the I/O request and determining the first device object, and a second program module performs the steps of determining from the second device object whether the device is available and determining the path to the target device, wherein the operations further comprise:

transmitting, by the first program module, a device availability request to the second program module to determine whether the target device is available; and returning, by the second program module, an indication of whether the target device is available.

24. The article of manufacture of claim 23, further comprising:

returning, by the second program module, a message to queue the I/O request if the device is not available; and queuing, by the second program module, the I/O request in response to the message.

25. The article of manufacture of claim 23, wherein there are a plurality of first and second path objects associated with different paths to the device, and wherein the second device object indicates a plurality of second path objects providing information on the paths to the device, further comprising:

transmitting, by the first program module, a path request to the second module after receiving indication that the target device is available;

selecting, by the second program module, a second path object indicated in the second device object in response to the path request;

returning, by the second program module, a path handle associated with the selected second path object to the first program module; and using, by the first program module, the path handle to determine the first path object associated with the path represented by the selected second path object, wherein the I/O request is transmitted on the path indicated in the determined first path object.

26. An article of manufacture for representing a plurality of paths to at least one device, wherein the article of manufacture causes operations to be performed, the operations comprising:

detecting paths to a device;

for each detected path, generating a first path object and second path object providing information on the path;

for each at least one device, generating a first device object and second device object; and indicating in the second device object each path to the device, wherein the first path object is generated by a first program module and the second path object is generated by a second program module, wherein the first program module generates the first path object after detecting the path to the device, wherein the operations further comprise:

transmitting, by the first program module, an identifier of the first path object for one detected path to the second program module, wherein the second program module generates the second path object after receiving the transmitted identifier; and including, by the second program module, the transmitted identifier in the second path object for the device.

27. The article of manufacture of claim 26, wherein the operations further comprise:

transmitting, by the second program module, an identifier of the second path object to the first program module; and including, by the first program module, the transmitted identifier from the second program module in the first path object.

28. An article of manufacture for representing a plurality of paths to at least one device, wherein the article of manufacture causes operations to be performed, the operations comprising:

detecting paths to a device;

for each detected path, generating a first path object and second path object providing information on the path;

for each at least one device, generating a first device object and second device object; and indicating in the second device object each path to the device, wherein the first path object and first device object are generated by a first program module and the second path object and second device object are generated by a second program module, wherein the operations further comprise:

determining, by the second program module, whether second path objects have been generated for all possible paths to the device; and notifying, by the second program module, the first program module to generate the first device object for the device, wherein the first program module generates the first device object in response to the notification.

29. A computer readable medium for handling Input/Output (I/O) requests to a target device, wherein the computer readable medium includes data structures comprising:
   a first path object and second path object that provide information on one path to the target device;
   a first device object associated with the target device; and
   a second device object associated with the target device indicating whether the device is available, wherein the first and second device objects provide information on the target device, wherein upon receiving an I/O request directed to the target device, the I/O is transmitted on a determined path to the target device if the device is determined to be available.

30. The computer readable medium of claim 29, wherein a determination is made from the second device object associated with the target device of one second path object, and wherein a determination is made from the first path object of information to transmit the I/O request to the target device using the path associated with the first and second path objects.

31. The computer readable medium of claim 30, wherein there are a plurality of first and second path objects associated with different paths to the device, and wherein the second device object indicates a plurality of second path objects providing information on the paths to the device.

32. The computer readable medium of claim 29, wherein there are a plurality of first and second device objects associated with different devices.

* * * * *